United States Patent [19]

Hörmann

[11] Patent Number: 5,351,441
[45] Date of Patent: Oct. 4, 1994

[54] SLIDING DOOR

[75] Inventor: Michael Hörmann, Marienfeld, Fed. Rep. of Germany

[73] Assignee: Marantec Antriebs-und Steuerungstechnik GmbH & Co. Produktions KG, Marienfeld, Fed. Rep. of Germany

[21] Appl. No.: 25,031

[22] Filed: Mar. 1, 1993

[30] Foreign Application Priority Data

Mar. 2, 1992 [DE] Fed. Rep. of Germany ....... 4206565

[51] Int. Cl.5 .............................................. E05F 11/54
[52] U.S. Cl. ...................................... 49/362; 74/89.17; 74/422
[58] Field of Search .............. 49/362; 74/89.17, 89.11, 74/439, 448, 422, DIG. 10

[56] References Cited

U.S. PATENT DOCUMENTS

| | | | |
|---|---|---|---|
| 2,563,702 | 8/1951 | Benford | 74/422 X |
| 2,651,541 | 9/1953 | Surles | 296/44 |
| 3,241,283 | 3/1966 | Ahlgren | 49/362 X |
| 3,257,756 | 6/1966 | Mealer | 49/362 X |
| 3,636,791 | 1/1972 | Barr | 74/422 |
| 4,366,649 | 1/1983 | Weigant | 49/362 |
| 4,722,238 | 2/1988 | Navarro | 74/422 |
| 5,058,446 | 10/1991 | Guey | 74/89.17 |

FOREIGN PATENT DOCUMENTS

| | | | |
|---|---|---|---|
| 0000455 | 1/1979 | European Pat. Off. | E05F 15/14 |
| 2064346 | 7/1971 | Fed. Rep. of Germany . | |
| 1559961 | 2/1972 | Fed. Rep. of Germany . | |
| 2404874 | 8/1975 | Fed. Rep. of Germany | E05F 15/14 |
| 2541717 | 8/1984 | France | E05F 15/14 |
| 511981 | 8/1939 | United Kingdom . | |

*Primary Examiner*—Philip C. Kannan
*Attorney, Agent, or Firm*—Alfred Stapler; Robert S. Lipton

[57] ABSTRACT

A sliding door which is moveable back and forth by a stationary drive motor unit, which has a drive pinion meshing with a gear rack attached to the door or the door's bottom rail, the gear rack being made of a series of adjacent rack segments extending in the sliding direction of the door and inserted in a retaining channel affixed to the door, the segments being manufactured as finished molded pieces and attached to each other with uniform tooth pitch along the rack, whereby the rack is low in cost, adaptable to various door displacement distances, and parts which are subject to heavy wear are readily replaceable.

7 Claims, 2 Drawing Sheets

SLIDING DOOR

BACKGROUND OF THE INVENTION

The invention relates to a sliding door and particularly to the bottom rail of a sliding door to which there is attached a door structure of desired configuration which is caused to slide back and forth by means of a stationary drive motor unit, using a pinion that meshes with a gear rack attached to the door itself or to its bottom rail.

Sliding doors of the type under discussion can be guided and supported so as to roll on floor-located rails. They can also be moved into and out of their closed position without floor contact on guide sheaves which extend over only a fraction of the door panel's length, in the manner of a sliding gate. In any case, the respective drives for the types of doors here under discussion are stationary and use a drive pinion which meshes with a set of teeth that extends over the width of the door in its sliding direction (or rather the width of the opening to be closed off by the door) or as a minimum over the effective door displacement path.

Also known are comparably constructed friction drives in which, however, the friction drive wheel of the drive motor unit must contact under pressure a matching friction rail and the possibility of slippage between these two elements makes it difficult for this drive system to reproduce the desired displacement path.

From German patent publication (DE-AS) 1559961, it is known to have the drive pinion engage a metal gear rack, whose teeth are formed by milling, and which requires an additional, even more expensive treatment to give it the desired life span and trouble-free operation. Also, temperature variations along the rack cause trouble in meshing, and weather exposure causes rusting and resulting wear and tear, leading to correspondingly high maintenance requirements. Similar problems arise when a chain drive is used, because its engagement between driving and driven members is inherently imprecise, and ill-suited to smooth rolling, so that noise, wear and tear and rust, and resulting maintenance requirements are similar to those of the previously discussed rack.

It is also known, from German utility model (DE-GM) 8400934.9, to use, instead of a milled rack, a pretensioned, toothed belt, extending in the sliding direction of the door. Its flexibility makes it possible to wrap it around a wide angle of the drive pinion which meshes with the belt's teeth. Such an essentially unconstrained, toothed belt has to be able to absorb substantial pulling forces, and also presents guidance problems. Moreover, the desired wide wrap angle causes continuous flexing of the toothed belt. This could be avoided by using a rack made of a synthetic plastic but, in light of well-known considerations, this would again be difficult to manufacture as a single unit.

SUMMARY OF THE INVENTION

Accordingly, it is the object of the present invention to provide a sliding door of the initially described type, having a rack drive assembly adjacent to the door panel, which can be adapted to any desired door width and which—especially when mass produced—can be manufactured inexpensively and whose portions subject to heavy wear and tear can be easily replaced.

Starting with a sliding door having the initially described characteristics, this object is achieved in accordance with the invention by assembling the rack itself from a series of rack segments inserted in a retaining channel which extends in the sliding direction of the door and which is attached thereto. These segments are produced as finished molded pieces and are fastened to each other so that their teeth follow each other with uniform pitch.

Two features cooperate to make it possible to provide such a rack of practically any desired length, and which can be manufactured inexpensively. One feature is the formation of the rack from a series of consecutively adjoining rack segments inserted in a channel, i.e., from relatively short lengthwise portions of the desired rack. This subdivision yields the ability to match various door lengths. The second feature is that each segment of this rack assembly is made as an injection molded piece, and particularly a synthetic plastic injection molded piece, which is finished and, therefore, needs no after treatment. The retaining channel, which is preferably cast or extruded from aluminum-based metal, is preferably formed as a single piece extending over the sliding distance. It is cut to the door panel length, its final length matching the sum of the lengths of the individually inserted rack segments. The rack's end segments can then be inserted, making it possible to secure the entire row of rack segments in the lengthwise direction of the retaining channel at both ends. The channel itself is screwed to the door panel or door rail. However, it is also possible to dimension the retaining channel independently, without regard to the repeat lengths of the rack segments, and then to appropriately shorten at least one of the segments extending beyond the end of the retaining channel. In that case, the row of rack segments is secured in the retaining channel by lateral screws or the like which pass through a sidewall of the retaining channel and penetrate into the base portion or the like of one or more of the rack segments. In principle, the rack segments could be secured in abutting sequential relation to each other by securing in place the individual segments or at least the end segments of the row of rack segments. The term "abutting" also includes sloping, arrow-shaped, or the like joints between segments, and also ones in which the tooth at the junction between two adjoining segments is made up partly from one and partly from the other segment, so that the whole of a single tooth encompasses adjacent tooth portions from two consecutive rack segments. In a preferred embodiment, there is provided between any two consecutive rack segments an interlocking arrangement consisting of a tenon formed on one segment and a mortise formed in the other segment. The arrangement can be such that the tenon is inserted into the mating recess of the mortise from a direction facing away from the teeth at right angles to the longitudinal direction of the segments. In this way, there is achieved a unitary, push and pull transmissive coupling between segments. Of course, such a coupling can also be effected by insertion from a different direction, but preferably, essentially, at right angles to the longitudinal direction of the rack assembly.

In a particularly preferred embodiment, the rack assembly which extends over the sliding path length of the sliding door, uses uniformly shaped rack segments, each of which extends only over a fraction of the total length, e.g., in the range of 100 min. These segments are preferably made of synthetic plastic injection molded pieces which form shell-shaped bodies in that the walls of the teeth, those of the base portions from which they extend and on which guidance lands for engagement with corresponding grooves in the retaining channel may be formed, and those of the tenon and mortise, as well as any stiffening ribs which may be provided, are all of approximately equal thickness.

In a still further preferred embodiment, the teeth of the rack assembly and, with it, those of the individual rack segments can be designed so as to slant slightly away from the perpendicular to the lengthwise direction of the segments. The drive pinion is then appropriately conformed to this tooth orientation.

BRIEF DESCRIPTION OF THE DRAWINGS

These and other preferred embodiments appear from the dependent claims, taken in conjunction with the illustrative embodiment shown in the drawings to which specific reference is made and whose description below further explains the invention. In these drawings:

DETAILED DESCRIPTION OF THE PREFERRED EMBODIMENT

Figures 1, 2:
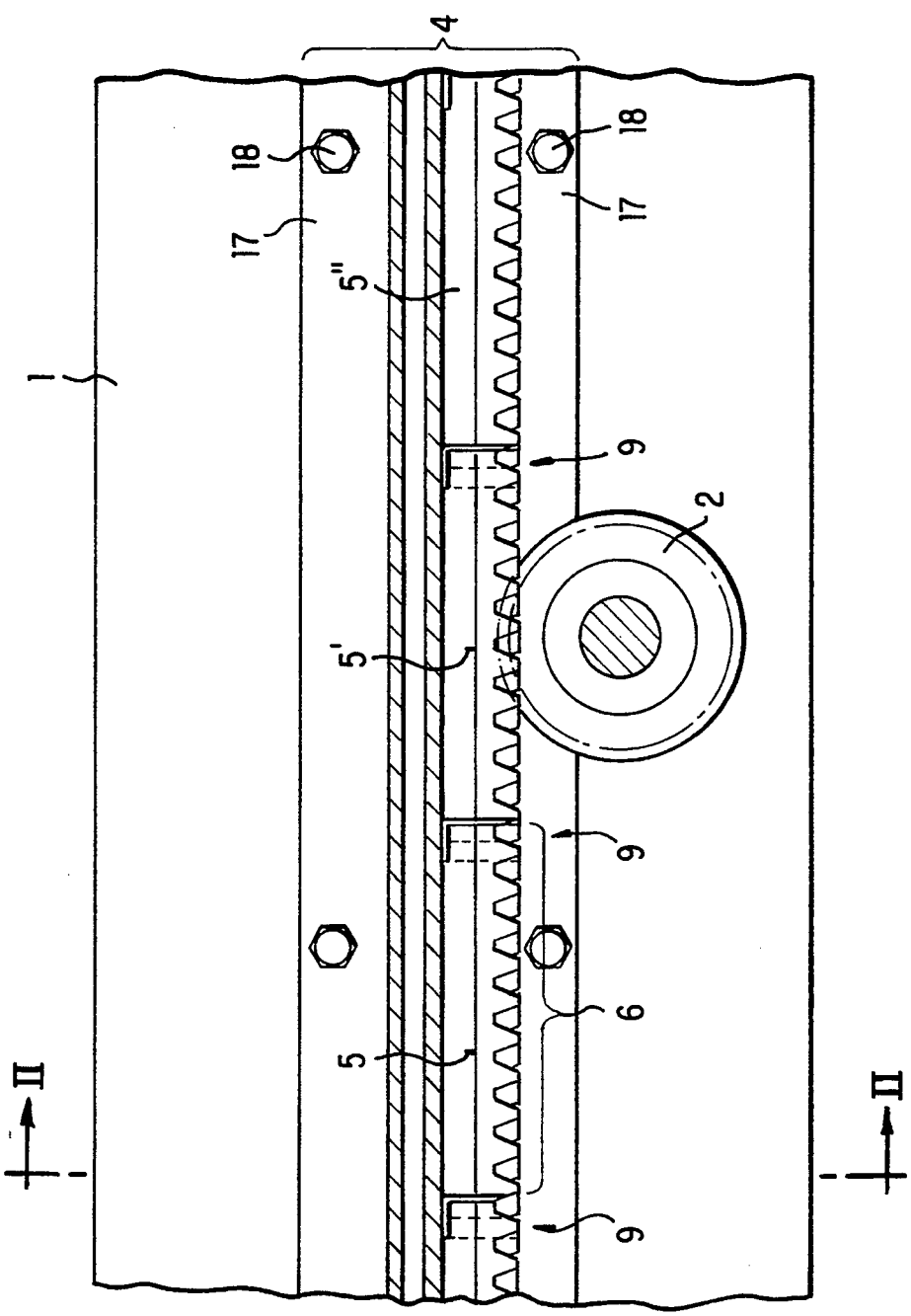
FIG. 1 shows a side view in the axial direction of the drive pinion of the drive motor unit (not shown) engaging a fragmentary longitudinal section of a door panel, or door bottom rail, the fragment being limited to the region near the drive.
FIG. 2 shows a cross-section taken along line II—II of FIG. 1 and which includes an end segment of the rack.

The fragmentary side view of FIG. 1 shows a door bottom rail 1 viewed from the side of the drive motor unit (not shown) on whose output shaft (shown in cross-section) a drive pinion 2 is fixedly mounted. The teeth of this pinion mesh with a correspondingly toothed rack assembly generally designated by reference numeral 3, which consists of a retaining channel 4 and a plurality of rack segments 5, 5', 5" . . . which are inserted next to each other in the channel. Each of rack segments 5, 5', 5" . . . is provided on the side facing drive pinion 2 with a tooth structure 6 which is formed in the course of manufacturing the rack segments through injection molding and needs no subsequent processing. The tooth structures 6 of the consecutive rack segments 5, 5', 5" . . . are so shaped as to produce a tooth pattern which is continuous from segment to segment. To that end, one or more teeth in the transition region between two adjacent elements can be composed of separate portions which are perpendicular, or slightly inclined with respect to the longitudinal direction of the carrier channel, one of these portions being part of one rack segment and the other being part of the other rack segment. In particular, due to the connection between two consecutive segments which is described in more detail in reference to FIG. 3, it is possible to produce teeth whose central portion is formed by the tooth structure of one segment and whose side (or end) portions as viewed in the transverse direction of the tooth structure are formed by the tooth structure of the other segment.

Figure 3:
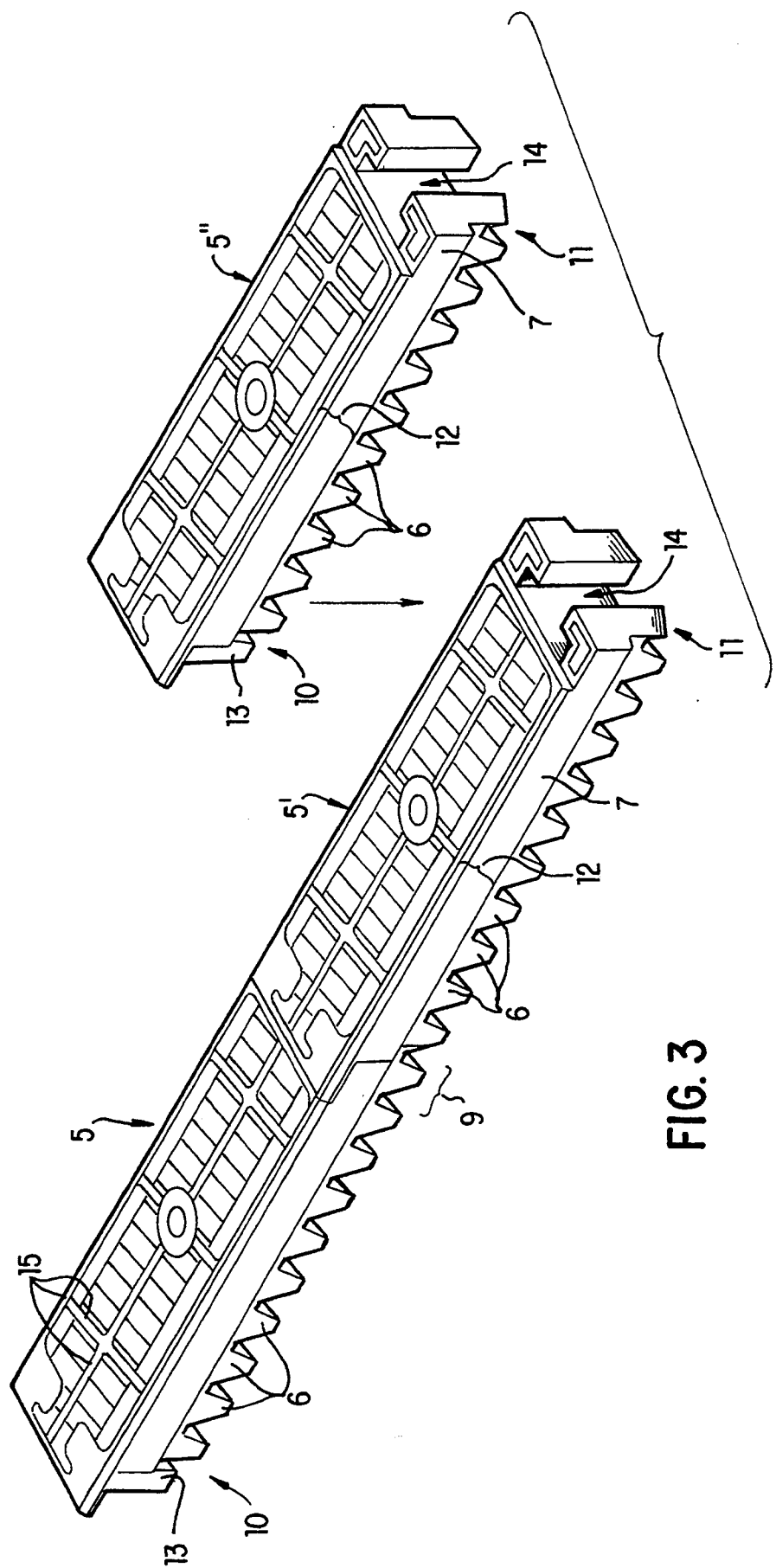
FIG. 3 shows a perspective view of three rack segments, two of which are interlocked, while the third diagrammatically illustrates how to achieve such interlocking.

In FIG. 1, reference numeral 9 designates an interlocking arrangement between consecutive rack segments 5, 5', 5" . . . As can be seen from FIG. 3, each of these interlocking arrangements consists of a tenon 10 and a mortise I 1. The tenon 10 which is formed at one end, e.g., the left end in the drawing, of each rack segment 5, 5', 5" . . . engages the respective mortise 11 formed at the other end—the right end in the figure. The segments themselves are of identical shape. In the present example, the tenon 10 is, generally, T-shaped when the tooth structure 6 is viewed from the top. The cross-arm 13 of the T extends perpendicularly to the longitudinal direction of the respective segments 5, 5', 5" . . ., and its stem extends into the tooth structure 6 of the respective segment. Each mortise 11 has a recess 14 whose cross-section conforms to the cross-arm of the T and to the stem of tenon 10 (which is not visible in the drawing). As indicated in FIG. 3, the connection between two rack segments 5' and 5" is made by inserting the tenon 10 of segment 5" into the recess of mortise 11 of segment 5' in the direction of the arrow in FIG. 3, i.e., from the side facing away from tooth structure 6 and perpendicularly to the longitudinal direction of the segments. The segments 5 and 5', shown in FIG. 3 are already in the interconnected state which is to be produced in this manner, the tenon 10 being inserted in the mortise 11 thereby creating the interlocking arrangement 9.

In the present illustrative embodiment, the tooth structure 6 of each segment is located above a base portion 12 which has lateral guidance lands 7 with which the segments 5, 5', 5" . . . are inserted into retaining channel 4, by sliding them only in their longitudinal direction. In so doing, the guidance lands 7 engage retaining grooves 8 in the sides of retaining channel 4, as can be seen particularly in FIG. 2. Each segment, or some of them, or else only those segments 5 which are located at the ends of the retaining channel after the same has been filled up, are secured in their position, so that the entire row of segments is fixed in its longitudinal direction. In the illustrative embodiment, this is done by means of screws 16 which pass through a vertical wall of one of the retaining grooves 8 of the retaining channel 4 and are anchored in the base portion 12 of the respective segment. The retaining channel 4 has two parallel, lateral support members 17 by means of which it is attached to the door rail 1 with screws 18. As shown in FIG. 2, this causes the channel to provide a sort of roof-like function for the segments 5, 5', 5" . . . retained by it, as well as for the meshing region between their tooth structure 6 and the teeth of drive pinion 2. As can be seen from FIG. 3, the individual rack segments 5, 5' and 5" . . . are shell-shaped in that almost all of the walls are of approximately equal thickness, namely the walls of the base, the tooth shapes of the tenon and mortise, as well as ribs 15 which provide overall shape stability by encompassing the base portion 12 and its guidance lands 7, as well as the inside of the tooth structure 6.

What is claimed is:

1. A sliding door, and particularly a sliding door bottom rail with attached door structure of desired configuration, movable back and forth in its sliding direction by a stationary motor drive unit, which has a drive pinion that meshes with a gear rack assembly attached to the door panel or bottom rail, wherein the rack assembly comprises a series of sequentially positioned rack segments inserted in a retaining channel extending in the sliding direction of the door panel and attached to said panel, said segments being made as finished molded pieces and secured in position relative to each other with uniform tooth pitch, and wherein the rack segments are provided at their respective adjoining ends with interlocking means comprising a tenon formed on one of the segments and a mortise in the adjoining segment, characterized in that, teeth which extend across the interlocking means are each composed of separate portions, formed by the tenon on the one hand and by the mortise on the other hand, and particularly with the tenon forming the central tooth portion as viewed over the width of the rack segment and the mortise forming the end portions adjoining both sides of the central portion.

2. A sliding door according to claim 1, characterized in that the rack segments are provided on both sides with guidance lands which engage corresponding retaining grooves in the retaining channel.

3. A sliding door according to claim 2, characterized in that at least those rack segments at the ends of the retaining channel are adapted to be secured against movement in the longitudinal channel direction, by means of specially shaped end portions of those segments which are located at the ends of the channel and/or by means of securing screws or arresting pins which extend transversely tot he longitudinal direction of the channel through one of its sidewalls, and particularly through the wall of a retaining groove, into the base portion of at least those rack segments at the ends of the retaining channel.

4. A sliding door according to claim 2, characterized in that, the rack segments are provided to form a connection with each other which is unitary and has a uniform teeth pattern in the sliding direction of the door, and which is capable of transmitting pulling and pushing forces.

5. A sliding door according to claim 4, characterized in that the rack segments are shell-shaped in that the walls of the tooth structures as well as those of the base portions which hold them and on which the guidance lands may be formed, and those of the tenon and mortise as well as any stiffening ribs which may be provided are made with substantially the same thickness over at least their major portions.

6. A sliding door according to claim 4, characterized in that the tenon is T-shaped and formed as a unit with the corresponding rack segment by means of its stem leading away from its cross-arm, and the mortise in the end portion of the adjoining rack segment has a recess which is adapted to mate with the T-shaped tenon.

7. A sliding door according to claim 6, characterized in that the tenon is adapted to be inserted in the recess with which it is to mate, from the side facing away from the tooth structure substantially at right angles to the longitudinal direction of the rack segments which are to be connected.

* * * * *